US011138269B1

(12) United States Patent
Sanders et al.

(10) Patent No.: US 11,138,269 B1
(45) Date of Patent: Oct. 5, 2021

(54) OPTIMIZING DATABASE QUERY PROCESSES WITH SUPERVISED INDEPENDENT AUTONOMY THROUGH A DYNAMICALLY SCALING MATCHING AND PRIORITY ENGINE

(71) Applicant: Wells Fargo Bank, N.A., San Francisco, CA (US)

(72) Inventors: Adam Sanders, Huntersville, NC (US); David L. Frost, Charlotte, NC (US); Christopher Shain, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 33 days.

(21) Appl. No.: 16/143,834

(22) Filed: Sep. 27, 2018

Related U.S. Application Data

(63) Continuation-in-part of application No. 15/710,150, filed on Sep. 20, 2017, now Pat. No. 11,010,675, which is a continuation-in-part of application No. 15/458,252, filed on Mar. 14, 2017, now Pat. No. 10,803,064.

(51) Int. Cl.
| | |
|---|---|
| *G06F 17/18* | (2006.01) |
| *G06F 16/903* | (2019.01) |
| *G06N 3/04* | (2006.01) |
| *G06F 16/2455* | (2019.01) |

(52) U.S. Cl.
CPC .. *G06F 16/90344* (2019.01); *G06F 16/24558* (2019.01); *G06F 16/24564* (2019.01); *G06F 17/18* (2013.01); *G06N 3/0472* (2013.01)

(58) Field of Classification Search
CPC ......... G06F 16/90344; G06F 16/24558; G06F 17/18; G06F 16/24564; G06N 3/0472
See application file for complete search history.

(56) References Cited

U.S. PATENT DOCUMENTS

| | | |
|---|---|---|
| 6,453,347 B1 | 9/2002 | Revashetti et al. |
| 7,756,827 B1 | 7/2010 | Yung et al. |
| | (Continued) | |

OTHER PUBLICATIONS

US 10,642,842 B1, 05/2020, Sanders et al. (withdrawn)

(Continued)

*Primary Examiner* — Hosain T Alam
*Assistant Examiner* — Chongsuh Park
(74) *Attorney, Agent, or Firm* — Schwegman Lundberg & Woessner, P.A.

(57) ABSTRACT

A system and related method dynamically modify a rule-based matching system. The process comprises receiving a rule set and a source data entity (SDE), and locating a plurality of matching data entities (MDEs) by searching a data node. The process further comprises, (a) determining a best MDE from the plurality of MDEs based on an MDE score created using the rule set, (b) receiving, a binary rater assessment rating that utilizes a factor that is independent of the rule set, the rater assessment comprising a binary degree of matching, (c) when the received binary rater assessment is yes, then designating the best MDE as an accepted MDE and updating information associated with the SDE, (d) when the received binary rater assessment is no, then eliminating the best MDE from the plurality of MDEs and repeating operations (a)-(d). The rule set is revised to dynamically produce a revised rule set.

18 Claims, 10 Drawing Sheets

(56) References Cited

U.S. PATENT DOCUMENTS

| | | | |
|---|---|---|---|
| 8,001,525 | B2 | 8/2011 | Agostini et al. |
| 8,103,534 | B2 | 1/2012 | Kruk et al. |
| 8,255,270 | B2 | 8/2012 | Rose et al. |
| 8,352,306 | B2 | 1/2013 | Rose et al. |
| 8,600,795 | B2 | 12/2013 | Birr |
| 8,775,231 | B1 | 7/2014 | Nipko et al. |
| 9,037,589 | B2 | 5/2015 | Anderson |
| 9,202,200 | B2 | 12/2015 | Stibel et al. |
| 9,323,767 | B2 | 4/2016 | Blanchflower et al. |
| 9,324,109 | B1 | 4/2016 | Joseph et al. |
| 9,594,743 | B2 * | 3/2017 | Bunin .................. G06F 16/367 |
| 10,146,853 | B2 | 12/2018 | Krauss |
| 10,339,147 | B1 | 7/2019 | Barmes et al. |
| 10,475,093 | B2 | 11/2019 | Sher |
| 10,484,501 | B2 | 11/2019 | Faltyn et al. |
| 10,489,758 | B2 | 11/2019 | Jain |
| 10,489,797 | B2 | 11/2019 | Noyes |
| 10,496,604 | B2 | 12/2019 | Boss et al. |
| 10,498,638 | B2 | 12/2019 | Jackson et al. |
| 10,803,064 | B1 | 10/2020 | Sanders et al. |
| 11,010,675 | B1 | 5/2021 | Sanders et al. |
| 2003/0023531 | A1 | 1/2003 | Fergusson |
| 2003/0023593 | A1 * | 1/2003 | Schmidt .................. G06N 5/025 |
| 2004/0143508 | A1 * | 7/2004 | Bohn ...................... G06Q 30/02 |
| | | | 705/26.1 |
| 2007/0299785 | A1 | 12/2007 | Tullberg |
| 2009/0037356 | A1 | 2/2009 | Rothstein et al. |
| 2009/0086947 | A1 * | 4/2009 | Vendrow ........... H04M 3/42229 |
| | | | 379/201.12 |
| 2009/0327040 | A1 | 12/2009 | McInerny |
| 2010/0063890 | A1 | 3/2010 | Huckleby |
| 2010/0131339 | A1 | 5/2010 | Singh |
| 2011/0246255 | A1 | 10/2011 | Gilbert et al. |
| 2011/0295854 | A1 | 12/2011 | Chiticariu et al. |
| 2012/0136812 | A1 | 5/2012 | Brdiczka |
| 2013/0096992 | A1 | 4/2013 | Sugimoto et al. |
| 2013/0124626 | A1 | 5/2013 | Cathcart et al. |
| 2013/0185086 | A1 | 7/2013 | Bank et al. |
| 2013/0275433 | A1 | 10/2013 | Shibata et al. |
| 2013/0311397 | A1 | 11/2013 | Shah et al. |
| 2014/0136494 | A1 | 5/2014 | Surya |
| 2014/0278799 | A1 | 9/2014 | McLean |
| 2014/0310290 | A1 * | 10/2014 | Huang ................ G06F 11/0751 |
| | | | 707/755 |
| 2015/0112755 | A1 | 4/2015 | Potdar et al. |
| 2016/0071134 | A1 | 3/2016 | Duncan |
| 2016/0232222 | A1 * | 8/2016 | McCloskey ........... G06F 16/951 |
| 2017/0053357 | A1 * | 2/2017 | Bowman ............. G06F 16/2471 |
| 2018/0232730 | A1 | 8/2018 | Harbour et al. |
| 2019/0213488 | A1 | 7/2019 | Zou |

OTHER PUBLICATIONS

"U.S. Appl. No. 15/458,252, Non Final Office Action dated Mar. 5, 2019", 11 pgs.

"U.S. Appl. No. 15/458,252, Response filed Jul. 5, 2019 to Non-Final Office Action dated Mar. 5, 2019", 9 pgs.

"U.S. Appl. No. 15/458,252, Examiner Interview Summary dated Jul. 10, 2019", 3 pgs.

"U.S. Appl. No. 15/710,150, Non Final Office Action dated Jul. 17, 2019", 14 pgs.

"U.S. Appl. No. 15/458,252, Final Office Action dated Sep. 17, 2019", 12 pgs.

"U.S. Appl. No. 15/458,252, Notice of Allowance dated Dec. 27, 2019", 9 pgs.

"U.S. Appl. No. 15/458,252, Response filed Dec. 17, 2019 to Final Office Action dated Sep. 17, 2019", 8 pgs.

"U.S. Appl. No. 15/710,150, Response filed Dec. 17, 2019 to Non Final Office Action dated Jul. 17, 2019", 9 pgs.

"Business Opportunities: Big Data", (Jul. 2013), 25 pgs.

"U.S. Appl. No. 15/458,252, Notice of Allowance dated Jun. 8, 2020".

"U.S. Appl. No. 15/710,150, Advisory Action dated Jun. 2, 2020", 3 pgs.

"U.S. Appl. No. 15/710,150, Final Office Action dated Mar. 23, 2020", 18 pgs.

"U.S. Appl. No. 15/710,150, Response filed May 22, 2020 to Final Office Action dated Mar. 23, 2020", 10 pgs.

"U.S. Appl. No. 15/710,150, Non Final Office Action dated Sep. 2, 2020", 18 pgs.

"U.S. Appl. No. 15/710,150, Response filed Dec. 2, 2020 to Non Final Office Action dated Sep. 2, 2020", 10 pgs.

"U.S. Appl. No. 15/710,150, Notice of Allowance dated Jan. 19, 2021", 9 pgs.

* cited by examiner

| | CREATE | UPDATE | DELETE |
|---|---|---|---|
| ENTITY | | | |
| RULE | | | |
| MATCH | | | |

FIG. 3

| RULE (PRE) | 50 |
|---|---|
| RULE (POST) | 55 |

FIG. 4

| RULE 1 | 50 |
|---|---|
| RULE 5 | 25 |
| RULE 8 | 75 |

| RESULT | 9.4 |
|---|---|

FIG. 2

OPTIMIZING DATABASE QUERY PROCESSES WITH SUPERVISED INDEPENDENT AUTONOMY THROUGH A DYNAMICALLY SCALING MATCHING AND PRIORITY ENGINE

CROSS REFERENCE TO RELATED APPLICATIONS

The present application is a continuation-in-part application of U.S. patent application Ser. No. 15/710,150, filed Sep. 20, 2017, and entitled, "Machine Learning Integration for a Dynamically Scaling Matching and Prioritization Engine", which is a continuation-in-part application of U.S. patent application Ser. No. 15/458,252, filed Mar. 14, 2017, and entitled, "System and Method for Dynamic Scaling and Modification of a Rule-Based Matching & Prioritization Engine", both herein incorporated by reference.

TECHNICAL FIELD

Described herein is a computer-based system, and more particularly, but without limitation, to a system and method for machine learning integration for a dynamically scaling matching and prioritization engine.

BACKGROUND

Typical computer matching engines rely upon predefined rules in order to determine whether two elements match. These engines further generally rely upon a substantial degree of similarity between elements in order to trigger a match. The elements that are matched need to be formed in a rigid manner so that a parsing engine may easily determine respective components of the element. Such systems, however, are not suited when the input is provided in a less-than structured form, and when rules that go into forming the matches are dynamically changing.

SUMMARY

Disclosed herein is a computer-implemented method for dynamically modifying a rule-based matching system, comprising, using a processor to perform a series of operations. The process comprises receiving, at the processor, a rule set that is stored in a rules database in a non-volatile memory-based storage device, receiving, at the processor, a source data entity (SDE) stored in the storage device, locating a plurality of matching data entities (MDEs) by searching in a data node, or data store external to the system. The process further comprises, based on the SDE and the rule set, (a) determining a best MDE from the plurality of MDEs based on an MDE score created using the rule set, (b) receiving, at an input of an analyzer, a binary rater assessment rating by a rater that utilizes at least one factor that is independent of the rule set, the rater assessment comprising a binary degree of matching that is a yes or no between the SDE and best MDE, (c) when the received binary rater assessment is yes, then designating the best MDE as an accepted MDE (AMDE) and updating information associated with the SDE, (d) when the received binary rater assessment is no, then eliminating the best MDE from the plurality of MDEs and repeating operations (a)-(d). The rule set is revised to dynamically produce a revised rule set based on an output of the analyzer, wherein the analyzer output is based on the SDE, the AMDE, and the rule set.

Disclosed herein is also a system comprising a hardware processor, a non-volatile memory-based storage device connected to the hardware processor comprising instructions. The instructions, when executed on the processor, configure the processor to locate, using a rule set, a plurality of matching data entities (MDEs) from a data node or data store external to the system comprising matching data that is based on a source data entity (SDE). The instructions further configure the processor to: (a) determine a best MDE from the plurality of MDEs based on an MDE score created using the rule set; (b) receive, at an input: a binary rater assessment by a rater that utilizes at least one factor that is independent of the rule set, the binary rater assessment comprising a binary degree of matching between the SDE and the best MDE, the SDE, the best MDE, and the rule set, (c) when the received binary rater assessment is yes, then designate the best MDE as an accepted MDE (AMDE) and update information associated with the SDE, (d) when the received binary rater assessment is no, then eliminate the best MDE from the plurality of MDEs and repeat elements (a)-(d). The instructions further configure the processor to revise the rule set to dynamically produce a revised rule set based on an output of the analyzer, wherein the analyzer output is based on the SDE, the AMDE, the rater assessment, and the rule set.

Disclosed herein is also a non-transitory computer-readable storage medium, the computer-readable storage medium including instructions that when executed by a processor, cause the processor to execute the method described above.

BRIEF DESCRIPTION OF THE DRAWINGS

In the drawings, which are not necessarily drawn to scale, like numerals may describe similar components in different views. Like numerals having different letter or numeric suffixes may represent different instances of similar components. The drawings illustrate generally, by way of example, but not by way of limitation, various embodiments discussed in the present document.

FIG. 2 is a block diagram that illustrates an implementation of combining applicable rules to produce a result.

FIG. 3 is a block diagram that illustrates a breakdown of an implementation of the system features.

FIG. 4 is a block diagram that illustrates one implementation in which, when a match made by the system the rule is updated based on whether the match is a good one or not.

DETAILED DESCRIPTION

Figure 1A:
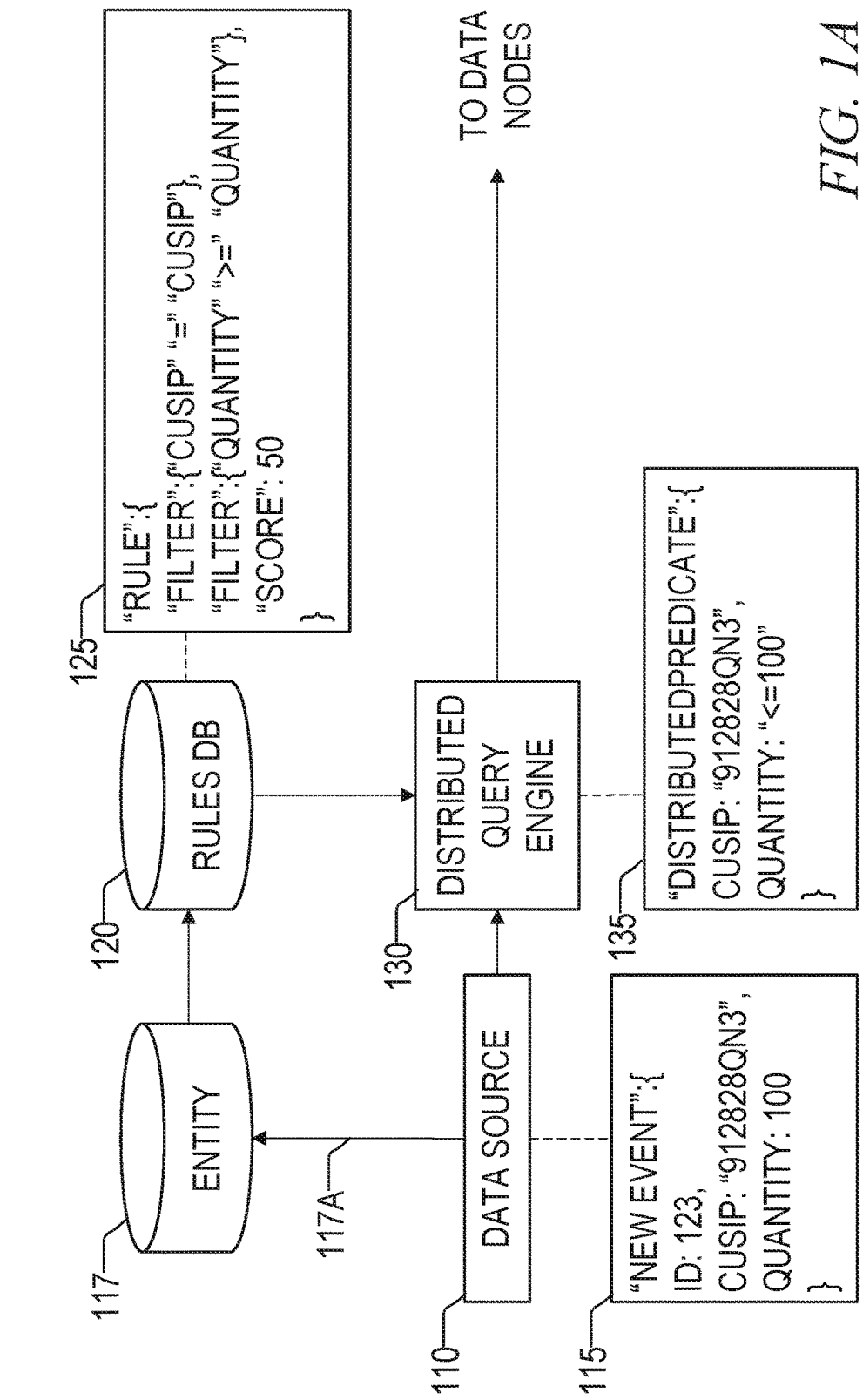
FIGS. 1A and 1B are parts of a block diagram illustrating an example of a matching system as described herein.

Systems for which inputs are not rigidly structured have relied extensively on human input to assist more basic computational determinations of good matches. A system and method for matching entities and rating such matches may benefit from use of a flexible system in which inputs are not rigidly structured, rules may be dynamically changed, and the system may be dynamically expanded in terms of computer resources based on those needed when executing the matching. A use case that is described below is a matching system for assisting customers of a financial securities service provider to find financial products that they are interested in. However, the systems and methods described herein are not limited in this regard, and may be used in any process that identifies trends between disparate data sets. A real-time calculation engine may be applied to any number of data sets and have business rules for identifying matched targets injected at runtime. In one implementation, the system may leverage enhanced software and algorithms built on top of a vendor supplied grid computing solution, such as Oracle Coherence.

Prior matching systems used in this field would historically have a sales team monitoring internal trading desk activities, which would include things such as offerings and request for quotes (RFQs). These would be stored in a database, and a sales team would rely on matching algorithms that looked at specific inquiries and offerings to determine if a good match was available. The sales team members could utilize their own human intuition to determine a potential for a good match, but such efforts are labor intensive, not necessarily cost effective, and may miss potential matches. This manual process relied heavily on the skill of the sales force and efficiency varied accordingly. Several systems have been utilized over the years to address this, but these systems rely on rigidly programmed algorithms utilizing structured complete datasets and therefore offer limited benefit, particularly since the underlying data is not cleaned over time and exponentially grows.

By way of example, one such system matched buyers and sellers based on an identifier, the Committee on Uniform Securities Identification Procedures (CUSIP), of the security. This solution works acceptably when there is an exact match on the security (e.g., a buyer for an IBM ten-year bond for and a seller for an IBM ten-year bond). However, this system does not work well when one or both ends of the match are not precisely defined or do not perfectly match. For example, if there is a seller for the IBM ten-year bond, but the buyer has only indicated an interest in a "mid-term blue-chip tech instrument", the system might not be able to easily determine that this may, in fact, be a good match.

Thus, an aspect of the present system is that it may allow for dynamically defined rules that are capable of "fuzzy-matching", based on loosely defined terms. It may further automatically determine a priority based on a weight of that match. Thus, in the systems described herein, an exact match as previously described still works perfectly, but the system may also pick-up a more generally defined request and perform a more accurate assessment of matching—the combination of a dynamically scaled distributed computing grid coupled with a scored weighting of ingested data and rules allows for a novel implementation.

Although the system described herein relates to a system and method for dynamic scaling and modification of a rule-based matching & prioritization engine, this system, in an implementation, may further comprise an interface to a system that actually executes matching trades.

A further implementation may utilize an analyzer that takes an assessment from a rater, such as a person or automated process, who is able to assess how good a current match is, and utilize that assessment to further modify the rules by using, for example, hidden correlations in the data.

Figure 1B:
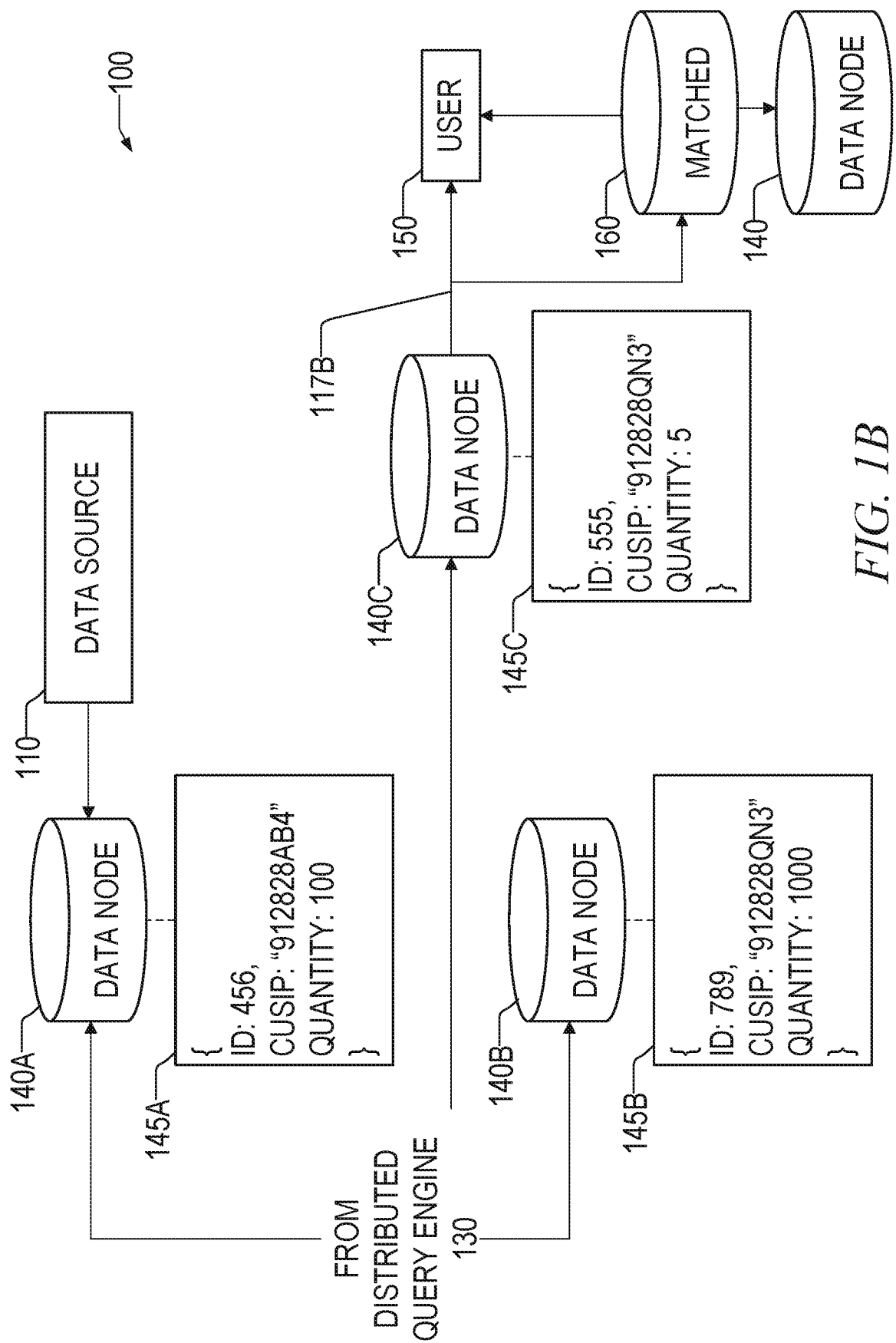

FIGS. 1A and 1B are parts of a block diagram illustrating an example of this system 100. In FIG. 1A, the system 100 allows a wide variety of data sources 110 to serve as inputs. A wide variety of inputs from various data sources 110 may be ingested by the system, and the system may be designed to scale based on a varying quantity of inputs from multiple data sources.

Some potential data sources 110 for the example systems described herein may include a first source of information from external data vendors, which includes things like holding information and public filings information that may be purchased from a data vendor. Such databases may be received periodically and then may be fed into the system. In that case, each record may be either a new record or an update of an existing record, and the event may be considered at the point in time that the database is imported. One second source of information may be internal systems and records, such as internal trading and sales systems that provide information as trades occur. One third source of information may be direct interaction with an end user, such as a person interacting with the system and entering data into the system using an input device (e.g., a keyboard). There may be further sources of information as well, such as publicly available news, social media, data services from which relevant information may be obtained, results from web searches and web crawlers, and so on.

An example event 115 from a data source 110 is illustrated in FIG. 1A. The event 115, designated "New Event" may comprise an identifier "123", a CUSIP of the security "912828QN3", and a quantity of 100 (shares). The event may sent as a source data entity 117A to be stored in an entity database 117 that is used to keep entities against which other entities are matched.

Although the event 115 may contain an attribute indicating an interest in a "buy" or a "sell" for the matching, in some scenarios, a client may not specifically be interested in a buy or a sell specifically, and may simply be learning about a particular asset, such as a mutual fund. By way of example, the user may be interested in hearing about business being done with respect to IBM or ten year treasuries without a specific buy or sell in mind. In that scenario, the user's interest may be recorded, and this interest may show up as a match for more generally constructed rules. In other scenarios, it may be known that the user is a holder of a given bond, and that user may be looking to expand their position or they may be looking to sell off that position. The fact that that the user is a holder of the given bond may constitute an input record without necessarily having a buy or sell indicator. But where a buy or sell interest is known, it could be included in the event database as well.

A matching metadata database (a rules database) 120 contains rules 125 that relate to entities such as the events 115 received from the data source 110. Rules 125 clauses (filters) may be flexible and extensible. They may be as simple or as complex as needed, and may include fuzzy matching or machine learning/artificial intelligence (AI) implementations. Multiple rules may be executed in parallel to produce matches based on different criteria. According to the rule 125 illustrated, two filters are utilized in order to contribute to a score of a match. The first example filter indicates that the CUSIPs of the entities must be equal in order for the rule to apply. The second filter indicates that the quantity of one entity is greater than or equal to the quantity of another entity. If this is true, then, for example, a match score of 50 may apply to the match. In the example, the score has a base of 100, so the match score of 50 may mean to modify an existing match score (from other rules, possibly) by 0.5.

In one implementation, the rules 125 may have clauses that are scored. In this implementation, the rule 125 as a whole either matches or it does not, although in other implementations, a degree of matching may be utilized. When the rule 125 matches, the score of that rule may be applied to an overall result of other rules 125 for a match, and all of the results of a plurality of rules 125 (at least two) may be combined in some manner (a sum, a product, a highest value of a matching rule, etc.). The matching rule should produce a non-zero rule score for the match.

FIG. 2 is a block diagram that illustrates an implementation of combining applicable rules to produce a result. After going through the matching metadata (rules) database 120, three rules (Rule 1 125A, Rule 5 125B, and Rule 8 125C) are found to produce a matching score between two entities. Scoring these rules as a percentage match, and taking a product of the rules, a result 125D of applying the rules indicates a 9.4% match between the two entities. Any form of normalization may be applied to produce relevant results.

A very generic rule may be applied that shows some form of a match, but is not very specific—thus, such a rule might have a low score. In contrast, a very specific rule (such as one requiring identity of security as well as exactly equal quantities) might have a much higher score. Thus, in one implementation, a rule score may be proportional to a degree of specificity. But the solution described herein is not limited to this. Different types of rules may be utilized that might match in a different way. For example, a rule might provide that if two entities match at a 50% level, then a smaller score will be applied than if they match at a 75% level. Furthermore, the scores do not have to be linear, but could be exponential or follow some other form of mathematical relationship. The resulting score on the match may be a flexible function of the rule that was used to produce that match. The rule and its related score may be manually assigned, calculated, or based on a derived answer, and any functions may be applied. It may be a very flexible value. In the above example, instead of just applying a value of 50 for a greater than or equal to value, one could create a formulaic score that is lower the further apart the values are.

A distributed query engine 130 may be used to perform a predicate evaluation that may be performed in parallel across all data nodes 140A, B, C discussed in more detail below (reference numbers herein having letter designations after them may be referred to collectively or representatively by the reference number alone—for example, 140A, B, and C may be referenced by 140). Based on the new event 115 received, a distributedPredicate 135 may be created and evaluated across the data nodes 140.

Referring to FIG. 1B, there are three data nodes 140A, B, C containing potential matching elements to the distributedPredicate 135 taken in conjunction with the rule 125. A data node 140 may store large numbers of documents that may be subject to analysis for matching, and the data in the data node 140 may have been previously or concurrently (with the current inquiry) obtained via the data source 110. The data source 110 may initially provide unstructured data, such as textual data, for ingestion and storage in the data node 140. However, the unstructured data may subsequently be provided with metadata, for example, tagging, by an analysis process that is either fully automated or utilizes the assistance of a person reviewing the ingested data. The data node 140 may contain the entity database 117 as a part of it.

Metadata in the form of field-level indexing may also be utilized within the data node 140 to optimize the evaluation process. The first data node 140A contains a first record 145A to consider matching against the rule 125. However, this record does not meet the first filter condition, that is, the CUSIPs do not match. The second data node 140B contains a second record 145B to consider matching against the rule 125. This record does not meet the second filter condition, that is, the quantity is too high. The third data node 140C contains a third record 145C to consider matching against the rule 125, and this matching element 117B is presented to the user 150. This record meets both of the filter conditions/requirements: it has the same CUSIP as required by the first filter, and the quantity is within the second filter. Therefore, the score of this record 145C as matched against the distributedPredicate 135 is 50. This scoring may be done to distinguish high-value matches from low-value matches, and, in one implementation, the matching results may be stored in a matched database, which may be a part of the data node 140 and/or reported in real-time to a client 150 or end-user. The filters may be designed so that they are all or nothing, that is, if the condition of the filter is not met, the rule is not met. However, it is also possible to design the filter to contain an equation that adjusts a rule score. For example, the rule score could be proportionate to how closely a quantity value matches between two entities.

The rules 125 may be flexible and configurable to accommodate a wide variety of situations, and may be changed in real-time, during operation of the system. By way of the example above regarding the IBM ten-year bond, a "blue-chip tech" term could be interpreted to mean a particular set of companies (and the different companies could be scored differently). However, if a company fell out of grace, this term could be removed from being interpreted as a "blue-chip tech", or else replaced with a lower scoring value. This could be done in real time, during operation of the system and in between searches, so that the matches made in one minute could differ from those made in the next if the underlying rule changed during that period of time. The rules 125 that govern the matches between data elements may be completely fluid and may be defined at runtime by users or by techniques such as machine learning. The rules 125 for determining matched results and the relative worth/score of those results may be distributed across all nodes 140 in the system.

In addition to rules 125 that directly relate to the matches, other types of rules may be present in the system 100. For example, meta-rules may be defined that guide how the system operates. These meta-rules may relate to the rules 125, as opposed to event matching. This may allow consistency of operation as a part of the infrastructure. For example, in an implementation, the following meta-rules might be employed. When a rule is deleted, matches resulting from that rule are retained. When a new rule is added, the system does not try to evaluate every possible match that could have resulted from that rule. When a rule is modified, the system goes back and updates any existing matches resulting from that rule. For example, a match may be disqualified or a score may be raised and lowered. The meta-rules (or any rules) may be application-specific, customizable, and may be different for different applications of the technology.

In an implementation, the system is event driven in that various types of events may initiate sequences, and the rules in the system may be triggered off of a variety of different events. The variety of different events may cause lifecycle processes to kick off in the system that may then update the entire distributed system.

FIG. 3 is a block diagram that illustrates a breakdown of an implementation of the system features. The system may comprise three elemental pieces: entities 115, rules 125, and matches 117B. For each of these elemental pieces, there may be create 310, update 320, and delete 330 operations. Using these three operations on the three elemental pieces, in an implementation, may provide complex system functionality. A new entity might be entered into the system that may trigger one or more rules to execute, which, in turn, may create one or more matches. An entity might be updated which may trigger some rules to update their resulting actions. Some matches may be created, some matches may be deleted, and some matches may be changed in response to an entity update. Or if an entity is deleted, the result might be a number of matches being removed.

In this manner, through a combination of configurable and self-evolving algorithms, the system may identify matches that may create opportunities for those processing the data. In a sales context, the system may present these opportunities to a sales team as a highly optimized and configurable queue of opportunities. The system may dynamically model the data and match it with other dynamically ingested data. The computing grid may also automatically scale to handle a varying number of entities being processed and/or increased algorithmic complexity (that is, a varying in complexity of the rules).

The distributed data nodes 140 may be added at runtime. Each node 140 may operate as a combination ingestion/storage/calculation engine, and may ingest data according to the data configuration rules 125 that may be defined at runtime. The data itself may be dynamically added from any source format.

The software may self-organize the data and processing to ensure dynamic scalability regardless of the number of nodes that are added to the cluster, the amount of data housed, or the complexity of the evolved algorithms. Matched results may be stored in a matched data element/store or match database 160 that may be reflected to non-computing mirrors that route the results to a high-efficiency display system. The data in the matched database 160 may be a part of (or possibly incorporated into) the data node 140. Users 150 may leverage the system 100 to observe and interact with the underlying data, algorithms, and relative scores of matches among data-points or entities. The users may provide input based on the matching results and the system may intelligently update the underlying algorithms to include this input in the calculations. For example, the user may indicate that a particular system-generated match is not appropriate, and this "breaking" event may be used to lower the system-calculated score for future matches of the same type (more detail given below).

In one implementation, distributed computing may be used to scale processing power generally linearly with the number of compute and/or ingestion nodes (distributed query engines 130) added. The system 100 may be designed to allow for ingestion of any data with limited restrictions on the format or source. The system 100 may also dynamically modify the rules at run-time, during operation of the system and between matches, by optimizing the matching algorithms based on the content of data that is currently being ingested and the type and extent of the analysis being performed. Thus, the processing power may be expanded based on only on a volume of input data to be ingested, but also based on a computational demand created by the complexity of the rules. Thus, the scaling may be based off of predictive branching. The system may determine that because a particular rule is invoked and creates a partial match, it determines that a further analysis needs to be done, and that this further analysis need to invoke available computational power in the grid. And the system may be able to eliminate branches of computation to scale more efficiently and effectively. This design allows for even better scalability and performance because the system may rely on predictive branching to optimize the dataset being evaluated. For example, the system may determine that a particular matching rule is comprised of an "expensive" calculation and a simpler "cheap" calculation. Rather than evaluating these calculations in arbitrary order, the system may choose to evaluate the cheaper calculation first to potentially rule out matches without having to execute the expensive calculation.

When the system 100 is utilized to operate on financial information in a capital markets space, it may be capable of providing high-quality targets for sales with accuracy and speed. This system 100 may be integrated with systems for Indications of Interest, Requests for Quotes, Offerings, and Static Product Data, to name a few in this space, and may be capable of evaluating matches using real-time market information, such as price or credit rating. The system 100 may also calculate relative information on the underlying data such as time-to-maturity for bonds and integrate that into the weighting.

Users may interact with this real-time system 100 model to optimize matches and further enhance the usefulness of the system and algorithms. The system's design allows improvements to identifying and matching counterparties for interactions/transactions based on loosely defined information. Users may also enrich data with additional information that was not included in the original ingestion in real-time. Because of the dynamic nature of the system, this additional information may automatically be included in the calculations and matches.

This may be accomplished, for example, by providing feedback into the system. FIG. 4 is a block diagram that illustrates one implementation in which, when a match made by the system the rule is updated based on whether the match is a good one or not. Such matches may be marked by a person as good or bad, and the system may integrate the feedback into the rules to assist it in applying those rules in the future. In FIG. 4, an initial (pre) rule is applied to a certain match and produced a result of 50. This match could be, for example, a matching of a "ten-year security" with a "mid-term security." A user reviewing the match recognized it as a good match and provided an indicator to the system that this was a good match. In response, the system could update the rule to produce a (post) rule 125' that gives such a match a result of 55 in the future. In another implementation, the system may receive automated feedback as to whether a particular exchange took place or not (e.g., the user who was looking to buy "a mid-term security" executed on a ten-year security). An actual exchange, closed deal, or closed trade may be a good indicator of a good match.

When changes are made in the system (either user, input data, or computer/AI-based), in one implementation, historical records may be kept of the changes that are made. This may permit a possible rollback to a particular point if problems develop. A delete, for example, may simply be a store with an older version number—so that it may be recalled later, if necessary. This may hold true, in an implementation, for matches. If two entities become matched as a result of a rule running, and then later on one of those entities is removed, the match may be removed as well (since one of those things that it points to is no longer in the system). But the match in the entity remove may still be archived for historical purposes.

Figure 5:
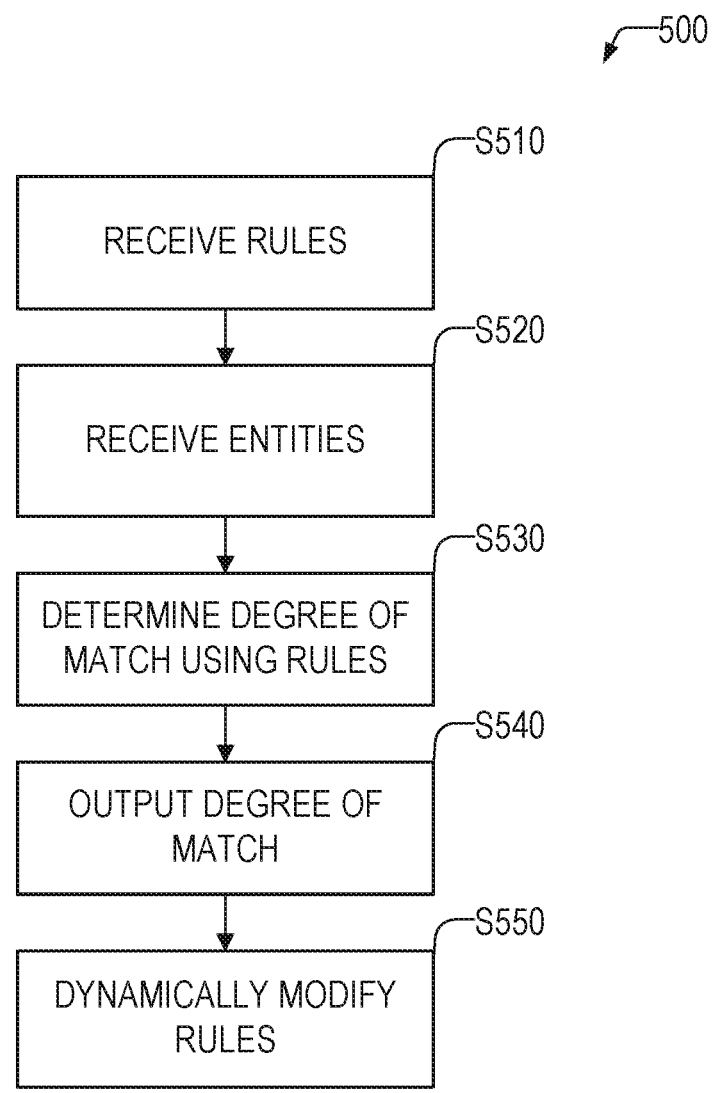
FIG. 5 is a high-level flowchart that illustrates an example of a process that may be used by the system.

FIG. 5 is a high level flowchart of the process 500 that may be used and is briefly described below. In operation S510, the initial rules that are to be used in the system may be defined and stored. These rules may be the rules 125 discussed above with respect to FIGS. 1A, 1B, that are stored in the matching metadata database (rules database) 120, that have clauses (filters) which may be flexible and extensible, and that relate to entities, such as the events 115 that are received from the data source. In operation S520, entities, such as the events 115 described above, may be received by the system and compared against other stored entities to determine, in operation S530, a matching or a degree of matching based on the rules. The matching may be implemented as described above with respect to FIGS. 1A, 1B. To determine a match, the clauses of the rules may be scored, and then, based on an operation of the scored clauses, a determination may be made as to whether there is a match. In another implementation, an actual score value may be determined for the match itself, which represents a degree of the match. In operation S540, the match or the determined degree of matching may be provided as on output, such as on a user display device. In operation S550, the rules may be dynamically modified at run-time by optimizing the matching algorithms based on the content of data that is currently being ingested and the type and extent of the analysis being performed.

The above-described system provides for a use of rules to determine a degree of matching between entities such that the system may dynamically change at run time. The following implementation builds on this system by providing an analyzer that may further utilize the input of a rater to make modifications to the rules that are utilized for the matching dynamically and based on real-time data. This implementation allows for the ingestion of data by layering an analyzer, which may comprise a neural network and a language processor to further assess matched entities based on a rater assessment. In one implementation, the rater assessment is a numerical score. Such a numerical score may be a range from one to ten, where one denotes a very poor degree of matching, and ten denotes a very high degree of matching. A very poor degree of matching may occur when, for example, an article is matched that is completely unrelated to the source data entity. A very high degree of matching may occur when, for example, an article is matched that is spot on the source data entity.

Figure 6:
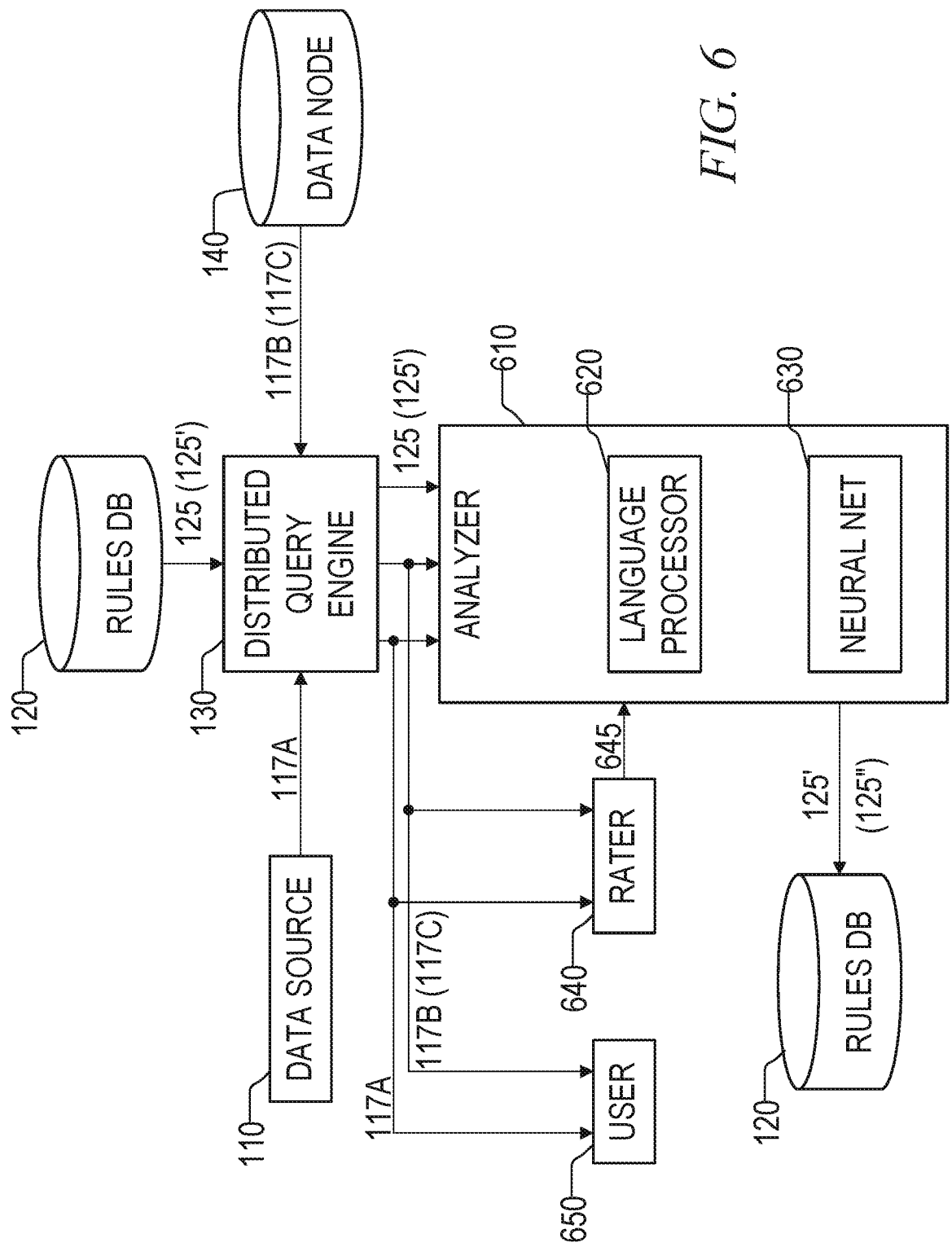
FIG. 6 is a block diagram of an implementation that utilizes an analyzer along with rater input to provide a further revision to rules that may make better matches.

FIG. 6 is a block diagram that shows one possible implementation using an analyzer 610 and the input of a rater 645 to produce potentially more, or better, results. The data source 110, as described above, may be the source of entity data 117 that is ultimately stored, such as in data node 140, or used as a basis of the search. In FIG. 6, the source data entity 117A is used by the distributed query engine 130 to search for a matched data entity 117B in the data node 140 directly or indirectly (e.g., by a request to a web-based search engine or an API call to obtain data from an external database, or data source, or data store) from the external data source 110 by using rules or a set of rules 125 stored in the rules database 120. The operation of the distributed query engine 130 is described above and portions of the description are repeated briefly here.

The source data entity 117A may be a text string or document, numerical values of data, simple or complex data structures, or any other type of information that may be matched with related information. Similarly, the matched data entity 117B may be a data element or document related to the source data entity.

The "known universe" of the system 100 may be a dataset generated by a previously described system composed of a number of distributed nodes 140A, 140B, 140C that may be dynamically added at runtime, and may operate as a combination ingestion/calculation engine. Each data node 140 may ingest data according to data configuration rules 125 of the rules database 120 that may be defined at runtime. Data may therefore be dynamically added from the source format into the data node 140. The rules 125 that govern matches between data elements 117 may be fluid and may be defined at runtime by users or by techniques such as machine learning. The machine learning may identify salient features of two inputs, for example, the source element 117A and the matching element 117B, and then apply feature identification and feature prioritization to identify which features are relevant to a "match". A feature may be a field, tag, or other metadata in a structured document, and may be text, a word, pair of words, triplets, etc. in an unstructured document.

The software may self-organize the data and processing to ensure dynamic scalability regardless of the number of nodes 140 that are added to the system or cluster, the amount of data housed, or the complexity of the evolved algorithms associated with the rules and analysis.

The matched results may be stored in a specialized data element 160 that may be reflected to non-computing mirrors to route the results to a display system, such as a high-efficiency display system. Users 650 may leverage this portal to observe and interact with the underlying data, algorithms, and relative scores of matches among datapoints. The users 650 may, in one implementation, prioritize a queue of the matches with their respective scores, and the system may intelligently update the underlying algorithms to include this input in the calculations. In another implementation, any rater 640 may prioritize a queue of matches with their respective scores.

The information stored in the "known universe" may be used to train a neural network 630 that forms a part of the analyzer 610. The system may be designed to create strong associations by ingesting data and any metadata or matching "tags" that may be associated with that information. The process of matching may be driven by rules that may be configured by users or algorithmically, for example, by the analyzer 610 described herein. In one implementation, the matches may represent a number of options for sales and trading, and may be presented as a priority queue to a user.

As seen in FIG. 6, the source data entity 117A, the matched data entity 117B, and the rule 125 are fed into the analyzer 610, and the former two are provided to a rater 640 that is able to rate, using at least one criterion that is independent of the rule, as to how good of a match the source data entity 117A and the matched data entity 117B are. The source data entity 117A and the matched data entity 117B may also be provided to the user 650, for example, to a hardware display associated with the user 650, as described above.

In some instances, the user 650 who inputs the data is the rater 640, meaning that the user 650 is the one who analyzes how well the match is and inputs data related to the degree of match. In other cases, the rater 640 is some other tool, such as an artificial intelligence tool or automated analytical tool that takes into account some other independent criterion. For example, a user 650 provides a source element 117A that relates to a particular type of investment, and the distributed query engine 130 locates a matching element 117B in the form of a particular type of financial instrument. In this example, a rater tool could determine whether the user 650 actually buys the type of financial instrument described in the matching element 117B to determine that this was a good match (and conversely, lack of a sale could be indicative of a poor match). Thus, the rater assessment in this example may be automatically generated based on sales data associated with the matching element 117B.

In either instance, the rater 640 provides some form of assessment 645 that may be used by the analyzer 610 to consider additional or hidden correlations useable in the future. The matched dataset in the known universe of the data nodes 140 may provide a basis for deriving a large amount of hidden correlation. Because these items may be a cultivated, filtered, limited, or restricted set-curated by users and algorithms-they may be mined for more subtle connections that are not necessarily strong matches.

By way of an example use case, consider a match between a buyer looking for short-term U.S. blue-chip bonds that have been matched by a trader offering a 3Y IBM bond. In this case, the source data entity is a description of a type of financial trading instrument "short-term U.S. blue-chip bonds"; the matching data entity is a description of a specific financial trading instrument "3-year IBM bond".

These two items may generate a positive match in the system based on tagged metadata—but they may also contain additional matching information that may not rise to the threshold of a "match" using the pure rules-based system.

However, by using a statistical model as apart of the analyzer 610, and looking over many (e.g., thousands) of matches performed over time, the statistical model may be developed for the relative worth of metadata and the likelihood that it will match with other pieces of information. In this use case, the words: (IBM, US, 3Y, BOND) may be the items that performed the match, but there may be other information available as well. Metadata for IBM may also include, computers, Artificial Intelligence, patents, and medical research. This additional information may not drive a match directly but may be influential in an aggregate statistical model.

The following further example illustrates the concept in more detail. A source element 117A is located in the form of a web page containing a text-based news article about the United Kingdom leaving the European Union ("Brexit"). Using the initial rule 125 that may include a word frequency count for the word Brexit, a matching document 117B may be located that contains numerous instances of the word Brexit. In other words, the two news articles are a match because they both contain instances of the word "Brexit". The machine learning algorithm may look at each of those two news articles and identify, for each word, whether that word was: a) relevant; and b) a good predictor of those two news articles being a match.

For this example, the analyzer 610 may seethe words "European Union" (EU) in both articles. However, EU might be less relevant in the sense that, although it is a relatively uncommon phrase in news articles as a whole, it is unlikely to be a great predictor (by itself) about whether any given news article is specifically about a match based on Brexit. There are other words that may be found in the articles that may be better predictors as to whether the article should be matched to other things about Brexit. For example, an analysis of the words "Theresa May" (British Prime Minister) may prove to be a better predictor. The algorithm may analyze all of the words in the articles and consider what the relative frequency of this word/phrase in all of the (large corpus of) news articles versus the relative frequency in topical articles linked using the hardcoded or predefined rule sets 125, and that the rater 640 has not specified are bad matches.

Once the analyzer 610 identifies those key phrases, it may use them in further matching future news articles that are input into the system. Thus, elements containing "Theresa May" (and possibly "EU", when found in combination with "Theresa May") in the same article likely has some linear increase in the chance of being matched to another article based on Brexit. The new rule set 125' may be modified to look for articles containing "Theresa May" and "EU" and consider them to be good matches for a source article containing Brexit, even though Brexit may not be found in the matched articles. In this example, the rule set 125' is a revised set that utilizes a word-based analysis to determine additional related relevant words. This may be contingent upon the rater's 640 assessment 645 indicating at least initially that such matches constitute good matches.

Although this example uses a web-based news article, the same concept may easily be extended to any kind of textual input (emails, IMs, transcriptions of voice conversations, and any textual input). Furthermore, the analyzer 610 is not limited to analyzing raw text, but may analyze any form of data that it is capable of processing, such as hypertext obtained from a web server source, or binary data obtained from a server application.

In any case, the analyzer 610 may formulate modifications to the rules, additions to the rules, deletion of certain rules, etc. in order to strengthen potential future matches. The analyzer 610, once it has received the rater assessment 645, may provide a modified rule set 125' that is stored in the rules database 125.

The analyzer 610 may incorporate a natural language cognitive processor 620 that ingests non-structured data intended for human consumption (such as real-time news feeds, social media, and web-site crawling) and runs this non-structured data through the trained neural network 630 to identify additional information regarding matches or potential matches. Using the IBM example, a news story describing that IBM has filed for over 8000 patents is found on a particular web site. In the "known universe" of the data nodes 140, two matches are found for the buyer of short-term US blue-chip bonds-one is the IBM security match and the other is a 3M security match. Both of the matches may have the same relative weight in the "known universe" based on the algorithms and user input, but this additional news information received in real-time may tip the scales in favor of the IBM security based on this news article about IBM's patents. Thus, in this way the system may act as a sales assistant adding market relevant and timely context—either negative or positive.

FIG. 6 further illustrates how the revised rule set 125' is then further utilized in a feedback manner. Once the procedure described above has finished, another inquiry for a same search is made of the system by providing the source data entity 117A. However, now the distributed query engine 130 is able to make use of the revised rule set 125' (reference characters for the second round are provided in parenthesis) in performing the search. This time, however, based on the revised rule set 125', it is able to locate a new matching element 117C that is more relevant than the previous matching element 117B. The process repeats itself, and now the analyzer 610 is able to produce yet another revision to the rules 125".

In addition, when multiple matching entities 117B are located by the searching, in one implementation, the rater input may provide a rater assessment for each of the matching entities 117B and a revising of the rule set may be based on a group of such rater assessments.

In this manner, the system may continuously improve to locate better and better matches over time—the entire system may operate in a self-evolving feedback loop providing the discovery of ever more nuanced and hidden correlations between entities, such as buyers and sellers of securities. This information may all evolve at real-time speeds based on readily available information without the need for additional programing or configuration utilizing natural language ingestion.

Figure 7:
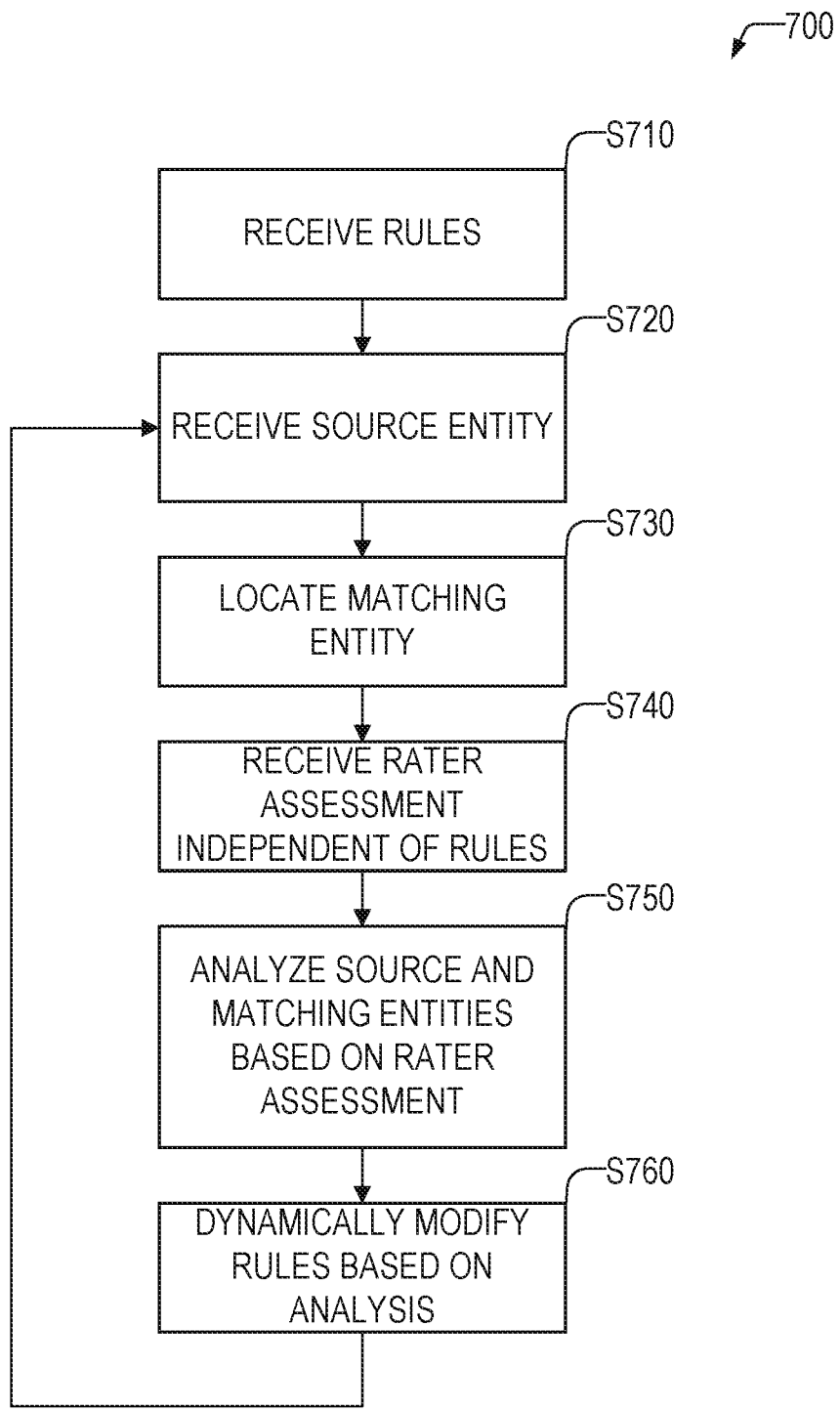
FIG. 7 is a flowchart of the implementation utilizing the analyzer.

FIG. 7 is a flowchart that describes a process 700 according to a further implementation. In operation S710, the initial rules that are to be used in the system may be defined and stored in a memory of the system 100. These rules may be the rules 125 discussed above with respect to FIGS. 1A, 1B, that are stored in the rules database 120, that have filters which may be flexible and extensible, and that relate to entities 117, such as the events 115 that are received from the data source 110.

In operation S720, a source data entity 117A may be received by the system 100. The source data entity 117A, as described above, is an entity that serves as a base for a match, and is compared against entities that may be stored in the data node 140 to determine if a match may be found.

In operation S730, a matching element 117B is located. The source data entity 117A may be provided to the distributed query engine 130 that utilizes a rule set 125 from the rules database 120 in order to locate the matching element, or a plurality of matching entities. As described above, the matching element 117B may be provided with an indication as to how well the matching element 117B matches the source data entity 117A. When a plurality of matching entities 117B are matched, they may be ordered according to how well they match the source data entity 117A.

In operation S740, a rater assessment 645 of a rater 640 that may or may not be a user 650 is received by the system. This rater assessment 645 provides an assessment based on at least one criterion that is independent of the set of rules 125 that was used to create the match. The independence of this criterion is beneficial in that it permits a richer analysis of the similarities between the source data entity 117A and the matching element 117B than already exist in the system via the existing rule sets 125 in the rule database 120.

In operation S750, the analyzer 610 utilizes inputs of the source data entity 117A, the matching element 117B, the rule set 125 used to find the match, and the rater assessment 645 in order to determine other relationships between the entities 117A, 117B and utilizing, e.g., a neural network 630 and a language processor 620 for the analysis—for example, looking for frequencies and relationships of particular words and/or metadata contained within the entities 117A, 117B. Additionally, the analyzer 610 may incorporate historical data in the data node 140 utilizing a statistical analysis of historical data stored within the data node 140 that is based on historically similar matches that have been made.

In operation S760, once additional relationships are determined by the analyzer 610, the rule set 125 may be modified to produce a new/modified rule set 125' that may then be added to the rule database 120. Different information may be located based on the new/modified rule set 125', and the located data may be stored for utilization in a subsequent operation, such as a report, a display, or an input to a routine that utilizes the located data. The process may then repeat again, with the system 100 receiving a source data entity 117A serving as a base for the match. As described above, however, the second time through the loop uses the modified rule set 125' instead of the original rule set 125, and thus may find more relevant matches to the same source data entity 117A. As the process 700 repeats the rule sets 125 used for the matching become more and more refined and produce better results, thereby dynamically optimizing the system 100.

Although various implementations of the above-described system 100 have been described with regard to enhancing the results produced in a search, in some instances it may be desirable to reduce the results produced in a search. The following implementation describes an application in which such reduced search results may be provided. By way of example only, a system and method will be described utilizing the system for ensuring proper matching of records for a two-sided exchange transaction having one or more buyers and sellers. However, the invention described herein is not limited to such an application and should be construed broadly and consistent with the claim language to cover any situation in which one and only one correct match should be the result of the search activities.

A two-sided exchange transaction involves at least one buyer and one seller. The seller typically offers some marketable element for sale, for example, 1000 shares of XYZ stock according to certain conditions, and a buyer willing to purchase the marketable element according to the certain conditions will accept the offer, and upon acceptance, the transaction is completed. The various parties to the transaction, buyer, seller, and clearing house, may all keep records of the transaction. However, there may be small discrepancies in the way the transaction is recorded between the different parties. Thus, it is important that, when verifying or closing out a transaction, these small discrepancies do not create problems, such as either a correct match not being recognized or an incorrect match being recognized as a match. Errors may creep in when, e.g., individuals type in details of the transaction and mistype some of them, or a system only rounds to the nearest penny or dollar, etc. This is particularly true in a VCON (voice confirmation) system in which transactions are conducted by voice communications, e.g., over a telephone, and subsequently recorded electronically.

In some situations, the marketplace may not be volatile when a transaction is desired. This may occur in Asia, for example, when a buyer or seller wishes to conduct a transaction/trade, but before various markets giving liquidity are open. In such situations, it is of particular importance to be able to accurately track various complex transaction when an order may be delayed due to lack of market volatility or for some other reason. In a multi-leg transaction, the requested transaction is broken down into a series of sub-transactions whose parts may be conditional upon successful completion (or lack of completion) the preceding sub-transactions. Here, the traceability between the orders and their execution is important.

In this usage of the system, it is thus important to filter out the noise (close, but improper matches) as best as possible and presenting, to a second independent reviewer, only a top-ranking result from a search. The second independent reviewer may be either an algorithm/processor different from that executing the rules from the rules database or a person who verifies whether the match is proper or not.

Matching errors may result when, for example, typographical errors are made in, e.g., a company name. For example, the seller's record may indicate that the shares belong to XYX corp., whereas the clearing house record may indicate that the shares belong to XYZ co. There may be small differences in timing due to the use of unsynchronized clocks on the different systems. It may also be possible that the transactions have one-to-many or many-to-many sub-transactions. For example, the sale of 1000 shares of XYZ stock may be met by three separate buy sub-transactions of 500 shares, 250 shares, and 250 shares. In reality, the transaction may be broken down into dozens of sub-transactions. Given such complexity, it is desirable to ensure that the proper sub-transaction is matched and combined to produce a full and accurate picture of all associated transactions. For bookkeeping, delivery allocation, and compliance purposes, the matching process is a part of the transaction because the allocations are entered on both sides of the transaction, and there is a need to tie out the records.

Figure 8:
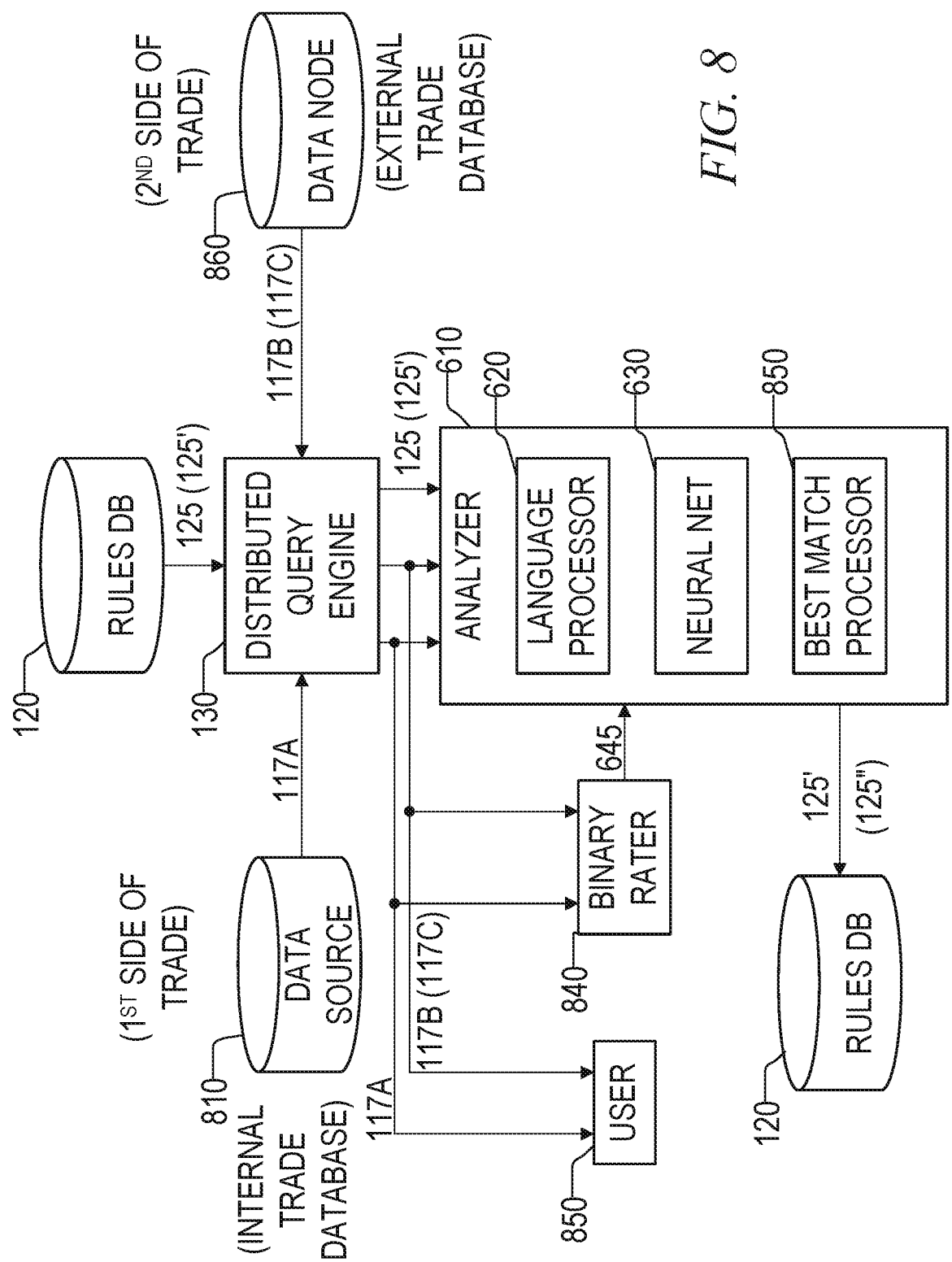
FIG. 8 is a block diagram of an implementation that utilizes an analyzer along with binary rater input to provide a further revision to rules that may make a single match.

FIG. 8 is a block diagram that shows one possible implementation using the analyzer 610 and the input 845 of a binary rater 840 as the secondary independent reviewer (a rater providing a binary yes/no to a particular result returned by the analyzer) to provide feedback in the form of a credible challenge that produces a most likely correct matching result where only one matching result is expected. In this scenario, it is possible that the binary rater 840 and the user 850 are one and the same, although, as noted above, the binary rater 840 may be an independent algorithm/processor. The data source 810 may be analogous to the data source 110 described above, and may, in the example implementation described, constitute a source of data regarding the first side of a trade or sub-trade, which may be a buy or sell transaction. Similarly, the data node 860 may be analogous to the data node 140 described above, and may, in the example implementation, constitute a source of data regarding the second side of a trade or sub-trade that complements the first side of the trade.

The analyzer 610 may operate similar to the analyzer 610 discussed above, but with a couple of differences. For example, the analyzer 610 may make use of a best match processor 850 that takes a number of possible matches to a search request and produces a single response that is subsequently assessed by the binary rater 840. The binary rater 840 may operate in a number of different ways. For example, when a search request returns with a number of possible matches, each of these matches may have a score as to how closely they match with the search request. The score may be based on any of the techniques described above, including some form of a weighted factor analysis. In one implementation, the score for the highest scoring return result may be adjusted to some maximum score value. For example, if return results are scored from 0 (no relationship or fit to the search criteria) to 100 (best possible relationship or fit to the search criteria), then a best scoring search result having a score of 80 may be reassigned a score of 100 to ensure that other elements of the system recognize this entity as a best match.

In one implementation, the best match processor 850 may create a single top-heavy matching rule that ensures propagation of the most likely match. In this implementation, a keystone weight may be applied to a constituent factor that was used to create the score for the top-rated return result, thereby pushing down the score or probability of a match for the other return results. In an example, three weighted factors are used to produce a score for a particular return result, where the weightings for each factor range from 0 to 100 as described above. In this example, the time of the transaction has a relatively heavy weighting of 75, meaning that a transaction located in the search occurring near the same time as the transaction in the search criteria will receive a high match score if the times are close. In this example, a top scoring return result whose times are very close may have the weighting in the rule adjusted to 100 for the time factor and the weighting for the other factors adjusted downward to produce a very strong best match for this result. When the binary rater 840 confirms that the best match produced by the best match processor 850, by whatever means, is an actual match, then the transaction data may be confirmed in the data source 810, and the transaction may be considered to be complete and recorded. When the binary rater 840 indicates that the best match produced by the best match processor is not a match, then this best match is removed from the return results, and the next highest scoring match may be used to repeat the procedure. The removal of the best match confirmed by the binary rater 840 as not being a match may be accomplished either by adjusting its score to 0 or by adjusting a keystone factor weighting that goes into making the score to 0. By way of example, a trader may offer out bonds at a certain price, and this offer may then be electronically matched with many customer portfolios. The matching engine may then generate a ranking of best matches, but sales representatives may then have a responsibility to have a last review and "approve" the match. In another example, once a transaction is queued, a matching process may be initiated to locate the proper internal customer record that corresponds to the customer that provided their portfolio. Before the transaction is booked by the back office, the sales representative may have a last look and implement a binary operation to "approve" that the electronically matched customer is in-fact the correct entity to settle with.

It is important in this situation that the determination made by the binary rater 840 be independent or relatively independent of the best match processor 850 in order for the binary rater 840 to add additional assessment value to the determination. This provides a "supervised autonomy" or "secondary credibility" over the automated matching, and greatly increases the likelihood that the match returned in this situation is the correct one.

Figure 9:
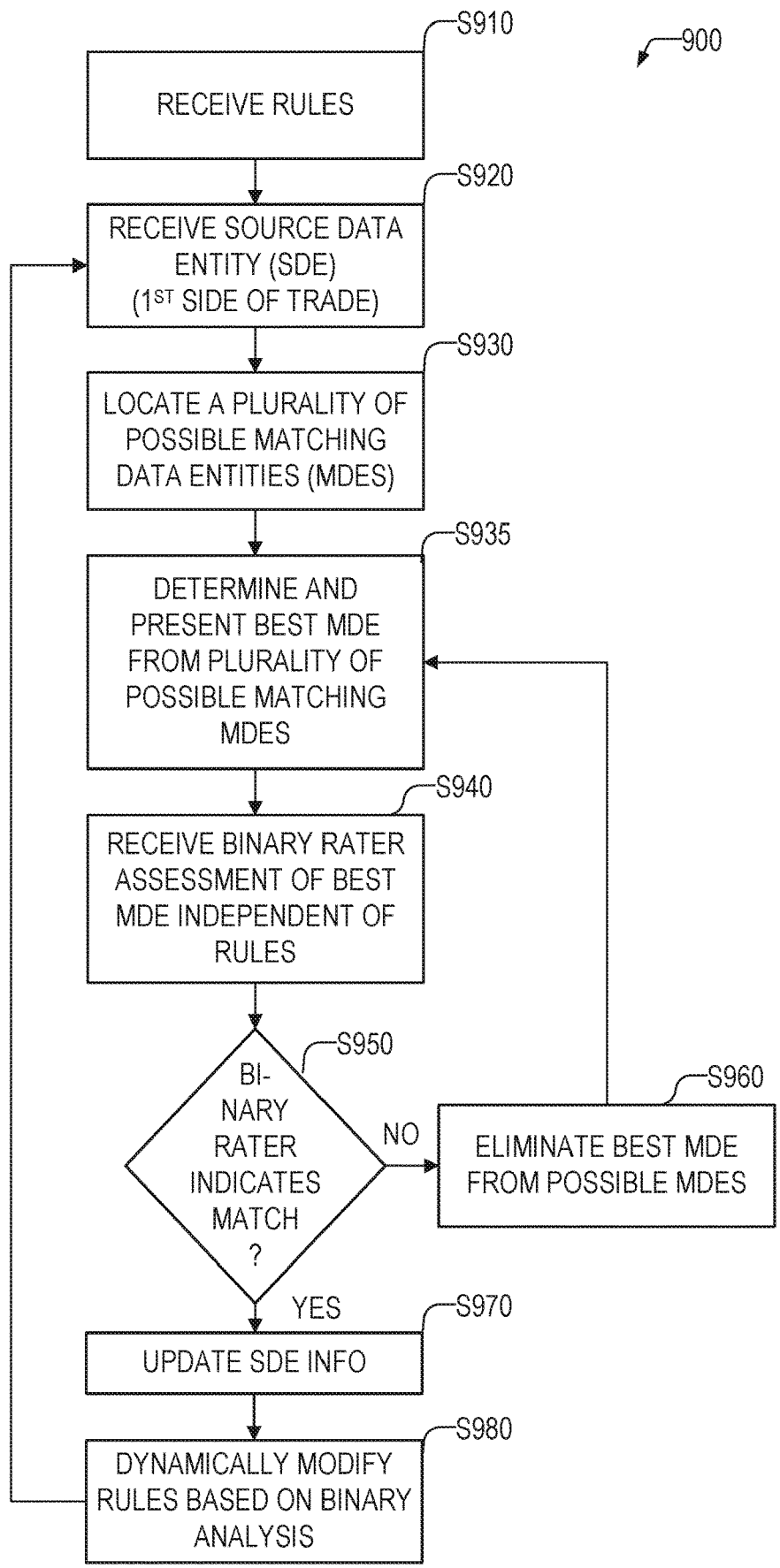
FIG. 9 is a flowchart of the implementation utilizing the analyzer for making a single match.

FIG. 9 is a flowchart that describes a process 900 according to the implementation discussed with respect to FIG. 8. The flowchart partially tracks the flowchart of FIG. 7. In operation S910, the initial rules that are to be used in the system may be defined and stored in a memory of the system 100. These rules may be the rules 125 discussed above with respect to FIGS. 1A, 1B, that are stored in the rules database 120, that have filters which may be flexible and extensible, and that relate to entities 117, such as the events 115 that are received from the data source 110.

In operation S920, a source data entity 117A may be received by the system 100. The source data entity (SDE) 117A, as described above, is an entity that serves as a base for a match, and is compared against entities that may be stored in the data node 860 to determine if a match may be found. In an implementation, the SDE 117A may be a first side of a trade that is stored in a trade database internal to the system 100.

In operation S930, a plurality of matching data entities (MDEs) 117B is located. The SDE 117A may be provided to the distributed query engine 130 that utilizes the rule set 125 from the rules database 120 in order to locate the plurality of MDEs 117B. As described above, the plurality of MDEs 117B may be provided with indications as to how well the MDEs 117B match the SDE 117A. The plurality of MDEs 117B may be ordered according to how well they match the SDE 117A based on a score that may be calculated by the analyzer 610.

In operation S935, the best match processor 850 may determine a best MDE from the plurality of MDEs using any of the techniques described above or any using any other assessment technique. Once the best MDE has been determined, it may be presented to the binary rater 840. The binary rater 840, as described above, is independent of the rules from the rules database 120 that are used to provide a score for the match. In operation S940, the analyzer 850 may receive the binary rater assessment in a form of a binary value (e.g., a yes/no value). Based on the decision, in operation S950 of the binary rater 840, the process may continue in two different paths. If the binary rater 840 determines that there is a match S950:YES, then in operation S970, the SDE information may be updated based on the best MDE 117B, and in operation S980, the rules in the rules database 120 may be modified based on the binary rating. The process may resume at operation S920.

If the binary rater indicates that there is no match S950:NO, then in operation S960, the non-matching best MDE is removed from the list of possible MDEs and the process continues from operation S935 where the best MDE may be determined after the previous best MDE has been discarded. In this way, the error rate of matching trades from different systems may be significantly reduced. Or, put more generally, there is a greater likelihood of finding the proper match when only a single match is expected.

General Computer and Network Architecture

Figure 10:
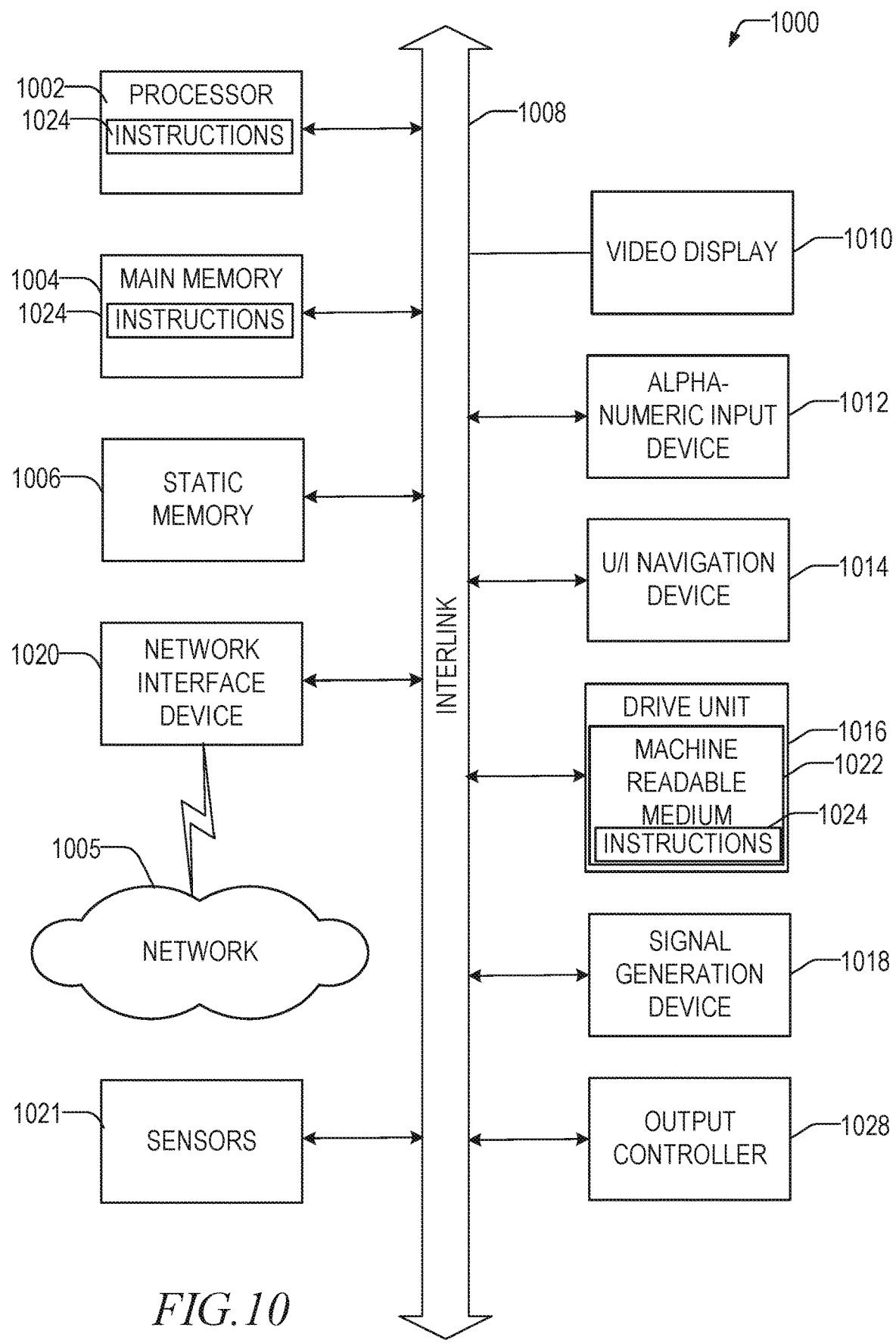
FIG. 10 is a block diagram illustrating a machine that may be a computer on which various processes described herein may be performed.

To describe some configurations in greater detail, reference is made to examples of hardware structures and interconnections usable in the designs of the present disclosure. FIG. 10 is a block diagram illustrating a machine that may be a computer on which various processes described herein may be performed. The machine (e.g., computer system) 1000 may include a hardware processor 1002 (e.g., a central processing unit (CPU), a graphics processing unit (GPU), a hardware processor core, or any combination thereof), a main memory 1004 and a static memory 1006, some or all of which may communicate with each other via an interlink (e.g., bus) 1008. The machine 1000 may further include a display unit 1010, an alphanumeric input device 1012 (e.g., a keyboard), and a user interface (UI) navigation device 1014 (e.g., a mouse). In an example described herein, the display unit 1010, input device 1012 and UI navigation device 1014 may be a touch screen display. The machine 1000 may additionally include a storage device (e.g., drive unit) 1016, a signal generation device 1018 (e.g., a speaker), a network interface device 1020, and one or more sensors 1021, such as a global positioning system (GPS) sensor, compass, accelerometer, or other sensor. The machine 1000 may include an output controller 1028, such as a serial (e.g., universal serial bus (USB)), parallel, or other wired or wireless (e.g., infrared(IR), near field communication (NFC), etc.) controller connection to communicate or control one or more peripheral devices (e.g., a printer, card reader, etc.).

The storage device 1016 may include a machine readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within static memory 1006, or within the hardware processor 1002 during execution thereof by the machine 1000. In an example, one or any combination of the hardware processor 1002, the main memory 1004, the static memory 1006, or the storage device 1016 may constitute machine readable media.

While the machine readable medium 1022 is illustrated as a single medium, the term "machine readable medium" may include a single medium or multiple media (e.g., a centralized or distributed database, and/or associated caches and servers) configured to store the one or more instructions 1024.

The term "machine readable medium" may include any medium that is capable of storing, encoding, or carrying instructions for execution by the machine 1000 and that cause the machine 1000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 1024 may further be transmitted or received over the communications network 1005 using a transmission medium via the network interface device 1020. The term "transmission medium" is defined herein to include any medium that is capable of storing, encoding, or carrying instructions for execution by the machine, and includes digital or analog communications signals or other medium to facilitate communication of such software.

The machine 1000 may communicate with one or more other machines 1000 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, virtual private networks (VPN), or any other way of transferring data between machines 1000. In an example, the network interface device 1020 may include one or more physical jacks (e.g., Ethernet, coaxial, or phone jacks) or one or more antennas to connect to the communications network 1026.

In an example, the network interface device 1020 may include a plurality of antennas to wirelessly communicate using at least one of single-input multiple-output (SIMO), multiple-input multiple-output (MIMO), or multiple-input single-output (MISO) techniques. In some examples, the network interface device 1020 may wirelessly communicate using Multiple User MIMO techniques.

A wide variety of computing devices may constitute a machine 1000, as described herein. The following list includes a variety of devices that may fit the definition of a machine 1000: a personal data assistant (PDA), a cellular telephone, including a smartphone, a tablet computing device, a laptop computer, a desktop computer, a workstation, a server computer, a mainframe computer, and the like.

Figure 11:
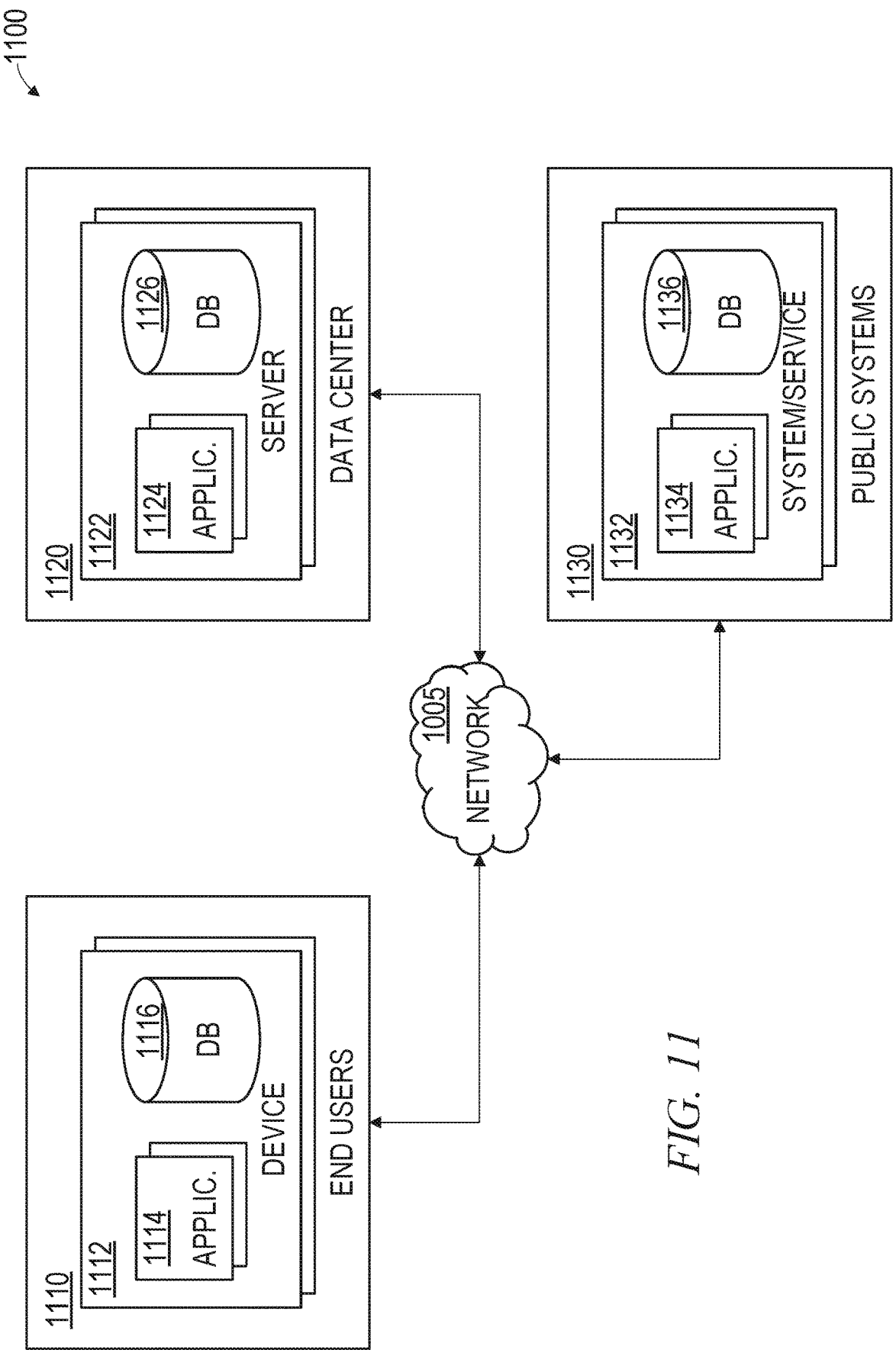
FIG. 11 is a block diagram of a distributed computing system.

FIG. 11 is a block diagram of a distributed system 1100 that may include a client-server architecture or cloud computing system. The system 1100 may be a system 100 as described above. Distributed system 1100 may have one or more end users 1110. An end user 1110 may have various computing devices 1112, which may be machines 1000 as described above. The end-user computing devices 1112 may comprise applications 1114 that are either designed to execute in a stand-alone manner, or interact with other applications 1114 located on the device 1112 or accessible via the network 1005. These devices 1112 may also comprise a data store 1116 that holds data locally, the data being potentially accessible by the local applications 1114 or by remote applications.

The system 1100 may also include one or more data centers 1120. A data center 1120 may be a server 1122 or the like associated with a business entity that an end user 1110 may interact with. The business entity may be a computer service provider, as may be the case for a cloud services provider, or it may be a consumer product or service provider, such as a retailer. The data center 1120 may comprise one or more applications 1124 and databases 1126 that are designed to interface with the applications 1114 and databases 1116 of end-user devices 1112. Data centers 1120 may represent facilities in different geographic locations where the servers 1122 may be located. Each of the servers 1122 may be in the form of a machine(s) 1000.

The system 1100 may also include publicly available systems 1130 that comprise various systems or services 1132, including applications 1134 and their respective databases 1136. Such applications 1134 may include news and other information feeds, search engines, social media applications, and the like. The systems or services 1132 may be provided as comprising a machine(s) 1000.

The end-user devices 1112, data center servers 1122, and public systems or services 1132 may be configured to connect with each other via the network 1005, and access to the network by machines may be made via a common connection point or different connection points, e.g. a wireless connection point and a wired connection. Any combination of common or different connections points may be present, and any combination of wired and wireless connection points may be present as well. The network 1005, end users 1110, data centers 1120, and public systems 1130 may include network hardware such as routers, switches, load balancers and/or other network devices.

Other implementations of the system 1100 are also possible. For example, devices other than the client devices 1112 and servers 1122 shown may be included in the system 1100. In an implementation, one or more additional servers may operate as a cloud infrastructure control, from which servers and/or clients of the cloud infrastructure are monitored, controlled and/or configured. For example, some or all of the techniques described herein may operate on these cloud infrastructure control servers. Alternatively, or in addition, some or all of the techniques described herein may operate on the servers 1122.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products.

Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like. The code may also be intangibly stored on one or more non-transitory and non-volatile computer readable media, such as those described above. In these cases, instructions resident on the media are read and executed by a processor to perform various functions.

The above description is intended to be illustrative, and not restrictive. For example, the above-described examples (or one or more aspects/configurations thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it should not be used to interpret or limit the scope or meaning of the claims.

Also, in the above Detailed Description, various features may be grouped together to streamline the disclosure. However, the claims cannot set forth every feature disclosed herein, as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the claims, along with the full scope of equivalents to which such claims are entitled.

The invention claimed is:

1. A computer-implemented method for dynamically modifying a rule-based matching system, comprising, using a processor:

receiving, at a processor, a rule set that is stored in a rules database in a non-volatile memory-based storage device;

receiving, at the processor, a source data entity (SDE) stored in the storage device;

locating a plurality of matching data entities (MDEs) by searching in a data node, or data store external to the system, based on the SDE and the rule set;

(a) determining a best MDE from the plurality of MDEs based on an MDE score created using the rule set where determining the best MDE score includes adjusting the MDE score from a first value to a second value, wherein the second value is a highest value such that a MDE of the plurality of MDEs is determined based on the adjusted MDE score having the second value;

(b) receiving, at an input of an analyzer, a binary rater assessment rating by a rater that utilizes at least one factor that is independent of the rule set, the rater assessment comprising a binary degree of matching based on the at least one factor that is a yes or no between the SDE and the best MDE;

(c) when the received binary rater assessment is yes, then designating the best MDE as an accepted MDE (AMDE) and updating information associated with the SDE;

(d) when the received binary rater assessment is no, then eliminating the best MDE from the plurality of MDEs and repeating operations (a)-(d);

revising the rule set to dynamically produce a revised rule set based on an output of the analyzer, wherein the analyzer output is based on the SDE, the AMDE, and the rule set.

2. The method of claim 1, further comprising:
applying, by the analyzer, a neural network and a language processor that at least partially determines the revising of the rule set based on determining relationships between the SDE and the AMDE.

3. The method of claim 2, wherein the relationships include at least one of:
frequencies or relationships of at least one of:
words or metadata contained within the SDE and the AMDE.

4. The method of claim 2, wherein the analyzer further utilizes a statistical analysis of stored historical data that is based on historically similar matches with respect to the source data entity for determining the revising of the rule set.

5. The method of claim 1, wherein the revising of the rule set utilizes a word-based analysis to determine additional related relevant words to the SDE.

6. The method of claim 1, wherein the adjusting the MDE score to the second value comprises adjusting a weighting of a factor used to determine the MDE score.

7. The method of claim 1, wherein the SDE is data related to a first side of a trade, and the plurality of MDEs are possible matches to a second side of the trade.

8. The method of claim 1, wherein the received binary rater assessment is an assessment of a user of the system.

9. The method of claim 1, wherein the SDE is a text-based entity.

10. The method of claim 1, wherein:
the SDE is a source text string; and
the AMDE is a related text string that is related to the source text string.

11. A system comprising:
a hardware processor;
a non-volatile memory-based storage device connected to the hardware processor comprising instructions that, when executed on the processor, configure the processor to:
locate, using a rule set, a plurality of matching data entities (MDEs) from a data node or data store external to the system comprising matching data that is based on a source data entity (SDE);
(a) determine a best MDE from the plurality of MDEs based on an MDE score created using the rule set where determining the best MDE score includes adjusting the MDE score from a first value to a second value, wherein the second value is a highest value such that a MDE of the plurality of MDEs is determined based on the adjusted MDE score having the second value; and
(b) receive, at an input:
a binary rater assessment by a rater that utilizes at least one factor that is independent of the rule set, the binary rater assessment comprising a binary degree of matching based on the at least one factor between the SDE and the best MDE;
the SDE;
the best MDE; and
the rule set;
(c) when the received binary rater assessment is yes, then designate the best MDE as an accepted MDE (AMDE) and update information associated with the SDE;
(d) when the received binary rater assessment is no, then eliminate the best MDE from the plurality of MDEs and repeat elements (a)-(d); and
revise the rule set to dynamically produce a revised rule set based on an output of an analyzer, wherein the analyzer output is based on the SDE, the AMDE, the rater assessment, and the rule set.

12. The system of claim 11, wherein the processor further comprises a neural network and a language processor that collectively at least partially determines the revising of the rule set based on determined relationships between the SDE and the AMDE.

13. The system of claim 12, wherein the relationships include at least one of frequencies or relationships of at least one of words or metadata contained within the SDE and the AMDE.

14. The system of claim 12, wherein the processor further utilizes a statistical analysis of stored historical data that is based on historically similar matches for determining the revising of the rule set.

15. The system of claim 11, wherein the processor utilizes a word-based analysis to determine additional related relevant words to produce the revised rule set.

16. The system of claim 11, wherein the processor, to adjust the MDE score to the second value, is configured to adjust a weighting of a factor used to determine the MDE score.

17. A non-transitory computer-readable storage medium, the computer-readable storage medium including instructions that when executed by a processor, cause the processor to:
locate, using a rule set, a plurality of matching data entities (MDEs) from a data node or data store external to a system comprising matching data that is based on a source data entity (SDE);
(a) determine a best MDE from the plurality of MDEs based on an MDE score created using the rule set where determining the best MDE score includes adjusting the MDE score from a first value to a second value, wherein the second value is a highest value such that a MDE of the plurality of MDEs is determined based on the adjusted MDE score having the second value; and
(b) receive, at an input:
a binary rater assessment by a rater that utilizes at least one factor that is independent of the rule set, the binary rater assessment comprising a binary degree of matching based on the at least one factor between the SDE and the best MDE;
the SDE;
the best MDE; and
the rule set;
(c) when the received binary rater assessment is yes, then designate the best MDE as an accepted MDE (AMDE) and update information associated with the SDE;
(d) when the received binary rater assessment is no, then eliminate the best MDE from the plurality of MDEs and repeat elements (a)-(d); and revise the rule set to dynamically produce a revised rule set based on an output of an analyzer, wherein the analyzer output is based on the SDE, the AMDE, the rater assessment, and the rule set.

18. The storage medium of claim 17, wherein the instructions further cause the processor to apply a neural network and a language processor that at least partially determines the revising of the rule set based on determining relationships between the SDE and the AMDE.

* * * * *